United States Patent [19]

Suzuki et al.

[11] Patent Number: 5,371,609
[45] Date of Patent: Dec. 6, 1994

[54] IMAGE PROCESSING METHOD AND APPARATUS FOR REDUCING IMAGE DEGRADATION

[75] Inventors: Akio Suzuki, Yokohama; Yoshihiro Takada, Kawasaki, both of Japan

[73] Assignee: Canon Kabushiki Kaisha, Tokyo, Japan

[21] Appl. No.: 147,452

[22] Filed: Nov. 5, 1993

Related U.S. Application Data

[63] Continuation of Ser. No. 676,565, Mar. 28, 1991, abandoned.

[30] Foreign Application Priority Data

| Mar. 30, 1990 | [JP] | Japan | 2-86172 |
| Jun. 20, 1990 | [JP] | Japan | 2-161566 |
| Sep. 20, 1990 | [JP] | Japan | 2-248727 |

[51] Int. Cl.$^5$ .............................. H04N 1/40
[52] U.S. Cl. ................... 358/448; 358/502; 358/518; 358/530
[58] Field of Search ............ 358/75, 80, 443, 401, 358/447, 448, 455, 461, 462, 296, 298, 300, 302, 502, 518, 530; 382/54, 55

[56] References Cited

U.S. PATENT DOCUMENTS

| 4,413,275 | 11/1983 | Horiuchi et al. | 358/75 |
| 4,723,129 | 2/1988 | Endo et al. | 346/1.1 |
| 4,740,796 | 4/1988 | Endo et al. | 346/1.1 |
| 4,752,822 | 6/1988 | Kawamura | 358/80 |
| 4,888,636 | 12/1989 | Abe | 358/80 |
| 4,953,114 | 8/1990 | Sato | 382/54 |
| 4,953,227 | 8/1990 | Katsuma et al. | 358/456 |
| 4,959,669 | 9/1990 | Haneda et al. | 346/157 |
| 5,023,919 | 6/1991 | Wataya | 382/54 |
| 5,032,903 | 7/1991 | Suzuki et al. | 358/75 |
| 5,050,227 | 9/1991 | Furusawa et al. | 382/54 |
| 5,142,356 | 8/1992 | Usami et al. | 358/80 |

OTHER PUBLICATIONS

Patent Abstracts of Japan, vol. 13, No. 135 (P-851) (Kokai 63-303370) (Dec. 1988).
Patent Abstracts of Japan, vol. 14, No. 173 (P-1033) (Kokai 2-25860) (Jan. 1990).

*Primary Examiner*—Richard Hjerpe
*Assistant Examiner*—Jerome Grant, II
*Attorney, Agent, or Firm*—Fitzpatrick, Cella, Harper & Scinto

[57] ABSTRACT

This invention relates to an image processing method and apparatus and particularly solves problems of image degradation in multi-generation copying (copying, using a previous copy output as an original).

A generation copy mode is provided in addition to the normal copy mode.

49 Claims, 11 Drawing Sheets

IMAGE PROCESSING METHOD AND APPARATUS FOR REDUCING IMAGE DEGRADATION

This application is a continuation of application Ser. No. 07/676,565 filed Mar. 28, 1991, now abandoned.

BACKGROUND OF THE INVENTION

1. Field of the Invention

The present invention relates to an image processing apparatus and, more particularly, to an image processing apparatus for improving quality of a multi-generation copy.

2. Related Background Art

A digital copying machine is known well as an apparatus for causing a reader to read an original, converting a read image into an electrical signal, and driving a record head or a laser to form an image in accordance with this electrical signal, thereby forming a copy. This digital copying machine has features such as image processing and image editing and has been very popular.

A digital color copying apparatus is superior to an analog color copying apparatus in image quality such as color reproducibility. Because of the possibility of obtaining various types of color copies by utilizing various editing functions, the market in this field is rapidly expanding.

FIG. 2 is a block diagram showing a flow of an image signal in the above digital color copying apparatus.

Referring to FIG. 2, a CCD 1 outputs R (red), G (green), and B (blue) signals 2a, 2b, and 2c to a black offset & shading correction circuit 3. The black offset & shading correction circuit 3 outputs shading-corrected R, G, and B signals 4a, 4b, and 4c to a log conversion circuit 5. The log conversion circuit 5 outputs C (cyan), M (magenta), and Y (yellow) density signals 6a, 6b, and 6c to a color processing circuit 7. The color processing circuit 7 outputs color-processed C, M, Y, and Bk (black) signals 8a, 8b, 8c, and 8d to a gamma correction circuit 9. The gamma correction circuit 9 outputs gamma-corrected C, M, Y, and Bk signals 10a, 10b, 10c, and 10d to an edge emphasis & smoothing circuit 20. The edge emphasis & smoothing circuit 20 outputs edge-emphasized and smoothed image signals 21a, 21b, 21c, and 21d to record heads 11a to 11d. The record heads 11a to 11d serve as cyan, magenta, yellow, and black record heads, respectively.

An original image is read by the CCD 1 and converted into electrical signals. The electrical signals are converted into the digital R, G, and B signals 2a, 2b, and 2c by an A/D converter (not shown). These signals are subjected to black offset processing and shading correction processing for correcting variations in the CCD 1 and an original illumination lamp (not shown) by the black offset & shading correction circuit 3.

A standard black board and a standard white board (neither is shown) are arranged in an original reader. By using these boards, the above processing operations are performed. More specifically, the standard black board is a black board having an optical density of 2.0, and the standard white board is a white board having an optical density of 0.07. Values A and B obtained upon reading of the black and white boards are stored in units of pixels. A value X obtained upon reading of an original is converted into the following value by the black offset & shading correction circuit:

$$X' = \frac{255}{B - A}(X - A)$$

In this case, each signal is an 8-bit signal which has a maximum value of 255.

The converted R, G, and B signals are logarithmically converted into the C, M, and Y density signals 6a, 6b, and 6c. These signals are subjected to color correction processing in the color processing circuit 7. Black extraction processing and masking processing are performed in this color correction processing. The black extraction processing is processing for extracting a black component from the C, M, and Y signals to improve reproducibility of black. The masking processing is processing for correcting transmission characteristics of filters within the CCD 1 and reflecting characteristics of inks C, M, Y, and Bk.

If signals input to the color processing circuit 7 are given as C, M, and Y, the black component is extracted by the following calculation in black extraction processing:

$$Bk = \min(C, M, Y)$$

Subsequently, color correction is performed in the masking processing as follows:

$$C' = a_{11}C + a_{12}M + a_{13}Y + a_{14}Bk$$

$$M' = a_{21}C + a_{22}M + a_{23}Y + a_{24}Bk$$

$$Y' = a_{31}C + a_{32}M + a_{33}Y + a_{34}Bk$$

$$Bk' = a_{41}C + a_{42}M + a_{43}Y + a_{44}Bk$$

The masking parameters $a_{11}$ to $a_{44}$ are set to obtain optimal color reproducibility.

The color-corrected signals (8a to 8d) are gamma-corrected in the gamma correction circuit 9. In the gamma correction circuit 9, gradation characteristics of the heads 11a to 11d are corrected to obtain a Linear relationship between the density signals and the print densities, and at the same time, the C, M, Y, and Bk components are balanced. When the gradation characteristics of the heads are linear, the gamma correction circuit 9 corrects the input C, M, Y, and Bk signals as follows:

$$C' = a_5 \times C$$

$$M' = a_6 \times M$$

$$Y' = a_7 \times Y$$

$$Bk' = a_8 \times Bk$$

The gamma-corrected signals 10a to 10d are subjected to edge emphasis and smoothing processing in the edge emphasis & smoothing circuit 20. The edge emphasis and smoothing circuit 20 performs known edge emphasis and known smoothing processing in the following manner.

FIG. 3 is a detailed block diagram of the edge emphasis & smoothing circuit 20. The edge emphasis & smoothing circuit 20 comprises a smoothing unit 22 for receiving the gamma-corrected image signal C on line 10a and outputting a smoothing signal on line 23, a subtracter 24 for outputting an edge component signal on line 25, multipliers 26, 27, and 28 for outputting product output signals on line 29, 30, and 31, respectively, and an adder 32 for outputting an output signal C on line 21a as an output signal from the edge emphasis & smoothing circuit 20.

The smoothing unit 22 averages image signals of neighboring pixels of a target pixel and outputs a smoothing signal S. If a smoothing matrix has a size of $3 \times 3$ and an image signal of a target pixel position (i,j) is given as f(i,j), the smoothing signal S is calculated as follows:

$$S = \frac{1}{9} \{f(i-1, j-1) + f(i, j-1) + f(i+1, j-1) +$$
$$f(i-1, j) + f(i, j) + f(i+1, j) +$$
$$f(i-1, j+1) + f(i, j+1) + f(i+1, j+1)\}$$

The subtracter 24 subtracts the smoothing signal S from the signal f(i,j) of the target pixel to extract an edge component. An edge component signal E is given as follows:

$E = f(i,j) - S$

The multipliers 26, 27, and 28 multiply the target pixel signal, the smoothing signal, and the edge component signal with predetermined coefficients $k_1$ to $k_3$, respectively. The adder 32 adds the product components from the multipliers 26, 27, and 28 and outputs an output signal from the edge emphasis & smoothing circuit 20.

The component coefficients $k_1$, $k_2$, and $k_3$ are determined by spatial frequency characteristics and the design concept of the copying machine. For example, when the spatial frequency characteristics of the copying machine are poor and a thin line is blurred, the smoothing signal coefficient $k_2$ is set to zero, and the edge component signal coefficient $k_3$ is increased. In order to emphasize a character original and a thin portion with good reproducibility, similar changes are performed. In order to emphasize a picture or the like of a print to obtain a good halftone image without forming a moiré pattern, the coefficient $k_3$ is set to be small, and the coefficient $k_2$ is increased.

In this case, $k_1 + k_2$ is kept constant because the sum $k_1 + k_2$ represents the magnitude of the signal. If this sum is changed, an image density is changed.

The edge emphasis and the smoothing processing are performed for the remaining color signals, i.e., M, Y, and Bk by using common coefficients. The record heads 11a to 11d are driven by the resultant signals, and a color copy is obtained. Each record head comprises an ink-jet head, a thermal head, or the like. When an electrophotographic system is employed, the record head is constituted by a semiconductor laser, an LED array, or a liquid crystal shutter array.

Even if the coefficients $k_1$, $k_2$, and $k_3$ are optimized, and when generation copying, i.e., copying of a copy output (i.e., the first reproduced image upon processing of the original) using as an original, a problem often occurs in reproducibility of an edge portion.

For example, when spatial frequency characteristics of the original copy are poor and correction is to be performed by edge emphasis, or when edge emphasis is performed to improve reproducibility of characters or thin lines, characters and lines are reproduced to be thick. In the second generation copying (an output from a copy original obtained from an original) using a copy output as an original, a thin line is further emphasized to further increase a line width.

When multi-generation copying is repeated, characters and thin lines become contiguous, and readability of the original is impaired, resulting in inconvenience.

In an apparatus which is set in an overemphasized smoothing mode to obtain a smoother halftone image, when generation copying is repeated, character and thin line elements are blurred, and readability of the original is impaired, resulting in inconvenience.

When a copy is to be obtained using an output color copy obtained as described above, a copied product has an excessively low density in a conventional arrangement, thus degrading readability of the copy due to the following reason.

Most copy originals are generally printed matter, and the maximum density of these originals reaches 1.8 to 2.0. Image processing is performed such that an image signal obtained upon reading of a portion having a maximum density of 2.0 is converted into the maximum value 225, of the image signal. When a given density corresponding to 255 represented by an image signal is 2.0 or less, gradation levels of densities higher than the given density cause contiguity of character elements, i.e., cause the character elements to run into each other where they should not. To the contrary, when a density exceeds the given density, all values to be represented by each 8-bit signal cannot be used, thus wasting the 8-bit signal. Therefore, a relationship between the original density and the image signal is as represented by a solid line A in FIG. 8.

The characteristics of a record head may not, however, have an ability of reproducing a density equal to that in printing. For example, in a record head of an ink-jet printer, the record density depends on the injection amount and the dye concentration of an ink. The ink injection amount is limited by the resolution and absorption properties of recording paper and the like, and the dye concentration of the ink is limited by injection stability and the like. In this sense, neither a large ink injection amount nor a high recording density can be set. In a practical application, a maximum optical density is about 1.5. Therefore, a relationship between the image signal and the recording density is as represented by a solid line B in FIG. 8.

Judging from the above consideration, a relationship between the original density and the output density is as represented by a solid line C in FIG. 8. However, if the maximum density is 1.4 or more, a sufficiently beautiful image can be obtained as a color copy. No problem occurs in copying an image from a normal original. When a copy output is used as an original and copying is performed (i.e., multi-generation copying is performed), a maximum output density is given as follows because the maximum density of the original is 1.5:

$$1.5 \times \frac{1.5}{2.0} \approx 1.13$$

The resultant image has poor readability.

When a print original is to be copied, it is known that gradation of a high-density portion is insufficient if an image signal for a density of 1.8 or more is set to be a maximum value. When an image signal for a density of 1.8 is set to be a maximum value, and the maximum value of the recording density is less than 1.8, the repetition density is lowered.

Color reproducibility in a digital color copying apparatus shown in FIG. 2 is greatly influenced by the values of the masking parameters $a_{11}$ to $a_{44}$. The masking parameters $a_{11}$ to $a_{44}$ are generally determined by the following method.

Assume that originals having n colors selected from a color space without any discrimination are given as $X_1$, ..., $X_n$. Chromaticity values of these originals are given as $(L^*_{X1}, a^*_{X1}, b^*_{X1})$, ... $(L^*_{Xn}, a^*_{Xn}, b^*_{Xn})$. Assume that these originals are copied to obtain color outputs $Y_1$, ..., $Y_n$, and that chromaticity values of these outputs are represented by $(L^*_{Y1}, a^*_{Y1}, b^*_{Y1})$, ..., $(L^*_{Yn}, a^*_{Yn}, b^*_{Yn})$. A sum of the squares of the color differences between the input and output images is represented by equation (4) below:

$$E_{Y-X} = \sum_{k=1}^{n} \Delta E^2_{abk^*}$$

$$= (L^*_{Y1} - L^*_{X1})^2 + (a^*_{Y1} - a^*_{X1})^2 +$$

$$(b^*_{Y1} - b^*_{X1})^2 + \ldots + (L^*_{Yn} - L^*_{Xn})^2 +$$

$$(a^*_{Yn} - a^*_{Xn})^2 + (b^*_{Yn} - b^*_{Xn})^2$$

(4)

The masking parameters are calculated to minimize the sum $E_{Y-X}$, which is then defined as an optimal solution.

The parameters thus obtained allow good average color reproduction throughout the color space.

It is, however, impossible to nullify a color difference (difference in color) between an original and its copy even if these parameters are used. It is inevitable that colors change to some extent upon copying processing.

The parameters obtained in the above calculation are enough to obtain satisfactory color reproduction when a normal original is to be copied to obtain a color image. However, a problem is posed in multi-generation copying wherein copying is performed using a copy output as the original.

If a copy output obtained by copying a first generation copy output $(Y_1, \ldots Y_n)$ as an original, i.e., a second generation copy output is given as $(Y_1', \ldots Y_n')$, a color difference between the original and the second generation copy output is larger than that between the original and the first generation copy output. That is, the color differences between the original and multi-generation copy outputs increase as the number of generations increases. With the recent widespread use of full-color copying machines, multi-generation copying is more frequently performed, thus posing a serious problem.

A parameter determining technique is disclosed in U.S. Pat. No. 5,142,356 wherein a reference image output from a printer is read from a reader and is compared with reference data stored in a memory, thereby determining color processing parameters.

This technique, however, cannot solve the above serious problem posed by multi generation copying.

SUMMARY OF THE INVENTION

The present invention has been made to solve the above problem, and has as its object to provide a copying apparatus for preserving clearness and smoothness of originals multi-generation copying and improving image quality.

In order to achieve the above object of the present invention, there is provided an image processing apparatus comprising input means for inputting image data, processing means for processing the image data input by the input means, output means for outputting the image data processed by the processing means, and mode selecting means for selecting one of a first mode for causing the input means to input the image data, causing the processing means to process the image data, and causing the output means to output the image data, and a second mode for causing the input means to input other image data.

An image processing method comprises the steps of a) inputting image data, b) processing the input image data, and c) outputting the processed image data, and selecting a first mode for performing steps a) to c) on the output image data or a second mode for performing steps a) to c) on other image data.

It is another object of the present invention to preserve resolution multi-generation copying.

In order to achieve the above object of the present invention, an image processing apparatus comprises a) input means for inputting image data, b) processing means for processing the image data input by the input means, c) output means for outputting the image data processed by the processing means, and d) memory means for storing at least a first parameter for optimizing a resolution to obtain first output image data from first input image data and a second parameter for optimizing a resolution to obtain second output image data from the first output image data as second input image data.

It is still another object of the present invention to provide an image forming apparatus for preventing poor readability of a copied image caused by a low density even if copying is performed using a copy output as the original.

In order to achieve the above object of the present invention, there is provided an image processing apparatus comprising a) input means for inputting image data, b) processing means for processing the image data input by the input means, c) output means for outputting the image data processed by the processing means, and d) a first mode for setting $D_2$ to satisfy condition $D_1 < D_2$ and a second mode for setting $D_2$ to satisfy condition $D_1 \simeq D_2$ where $D_1$ is a maximum recording density of the output means and $D_2$ is an original density corresponding to a maximum value of the output image data.

It is still another object of the present invention to provide a color copying apparatus for preventing an increase in color difference by repetition of multi-generation copying.

In order to achieve the above object, there is provided an image processing apparatus comprising a) input means for inputting image data, b) processing means for processing the image data input by the input means, c) output means for outputting the image data processed by the processing means, and d) memory means for storing a parameter for minimizing a color difference between first input image data and first output image data when the first output image data is to be obtained from the first input image data and a parameter for minimizing a color difference between second input image data and second output image data when the second output image data is to be obtained from the first output image data as the second input image data.

It is still another object of the present invention to provide a copying machine for a high-quality image, and a multifunctional copying machine.

In order to achieve the above object of the present invention, there is provided a copying apparatus comprising processing means for processing input image data, mode selecting means for selecting a generation copy mode or a normal copy mode, and control means for controlling processing parameters used by the processing means in accordance with a selection state of the selecting means.

The above and other objects, features, and advantages of the present invention will be apparent from the following detailed description of the preferred embodiments in conjunction with the accompanying drawings.

DETAILED DESCRIPTION OF THE PREFERRED EMBODIMENTS

A copying apparatus according to an embodiment of the present invention will be described with reference to the accompanying drawings.

Figure 1:
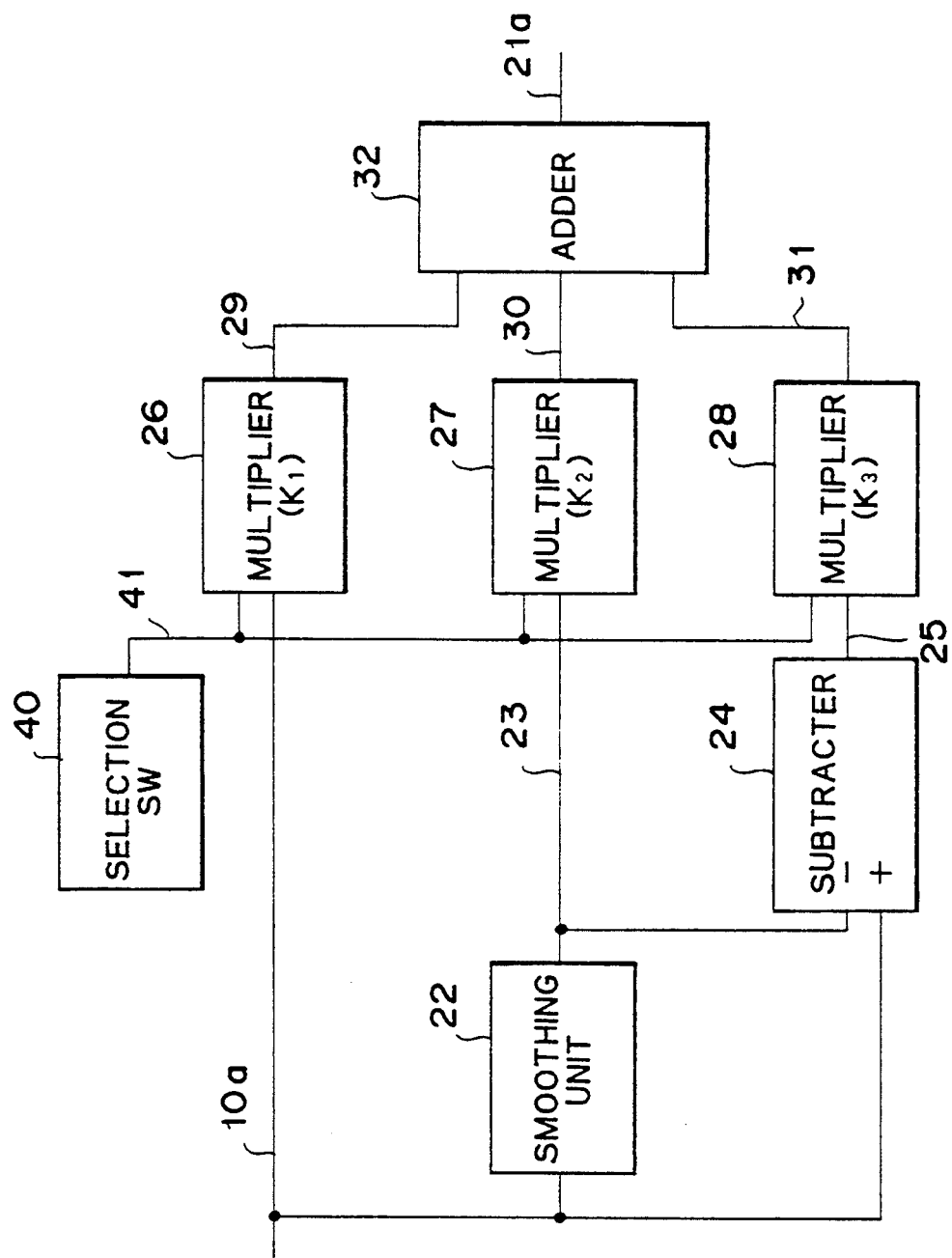
FIG. 1 is a block diagram showing a copying apparatus according to an embodiment of the present invention.
Figure 3:
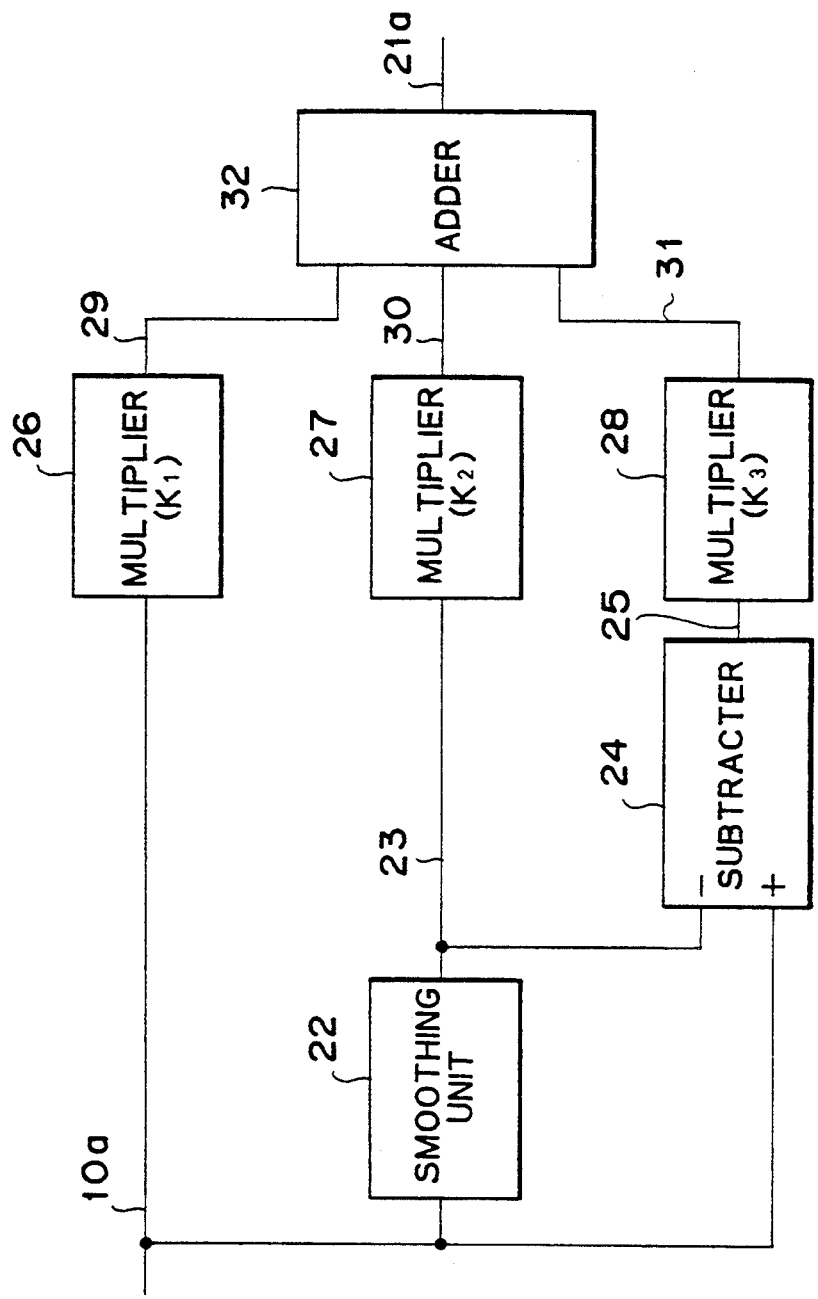
FIG. 3 is a detailed block diagram showing part of the copying apparatus shown in FIG. 2.

FIG. 1 is a block diagram showing an embodiment of the present invention. The same reference numerals as in FIG. 3 denote the same parts in FIG. 1, and a detailed description thereof will be omitted.

In the detailed arrangement of an edge emphasis & smoothing circuit 20 in FIG. 1, multipliers 26, 27, and 28 are arranged to variably change coefficients $k_1$, $k_2$, and $k_3$ in accordance with a control signal 41 from a selection switch 40. The selection switch 40 is arranged in an operation unit (not shown) and a user can operate the selection switch 40. The selection switch 40 is arranged to select a normal copy mode or a generation copy mode and is switched in response to the control signal 41. The edge emphasis & smoothing circuit shown in FIG. 1 is arranged for the C signal. Other edge emphasis & smoothing circuits for the M, Y, and Bk signals are arranged as described above, and common coefficients $k_1$ to $k_3$ are used therein. In this embodiment, since common color coefficients are used, the edge emphasis and smoothing effects of all the color components are equal to each other, thereby obtaining an image having a good color balance.

The multipliers 26 to 28 have two coefficient sets IK, and the sets are switched by the selection switch 40.

A first coefficient set $IK_1 = (k_{11}, k_{21}, k_{31})$ is determined to obtain an image having an optimal resolution from the background described with reference to the prior art. In design in favor of reproducibility of characters and thin lines, the edge emphasis coefficient $k_{31}$ is set to be large. However, in design suitable for a halftone image, the smoothing coefficient $k_{21}$ is set to be large.

On the other hand, a second coefficient set $IK_2 = (k_{12}, k_{22}, k_{32})$ is complementary to the first coefficient set so as to obtain an optimal resolution of an output image in the multi-generation copy mode. For example, the coefficient $k_{31}$ in the first coefficient set is set to be large. When a thin line is reproduced as a thick line, the coefficient $k_{32}$ is set to be slightly smaller than the reference value.

When generation copying is performed under the condition that the coefficient $k_{21}$ of the first coefficient set is set to be large, and when a thin line is blurred, the coefficient $k_{32}$ of the second coefficient set is set to be slightly larger than the reference value.

When copying is performed using a normal original, the user selects a normal copy mode with the selection switch 40 and causes the selection signal 41 to select the first coefficient set $IK_1$. Therefore, edge emphasis and smoothing are performed such that an optimal resolution can be obtained for the normal original.

When an original is a copy output, i.e., second generation copying is to be performed, the user operates the selection switch 40 to set the multi-generation copy mode (hereinafter sometimes termed a "generation copy mode"). In this case, the control signal 41 selects the coefficient set $IK_2$. In this state, when multi-generation copying is performed, edge emphasis or smoothing is performed to obtain an optimal resolution of the generation copy output. Thin line elements do not become contiguous or are blurred, thereby obtaining a beautiful multi-generation copy output.

Another embodiment of the present invention will be described below. In the first embodiment, when the first generation copy output is used as an original, i.e., when second generation copying is to be performed, optimal edge emphasis and smoothing coefficient sets are prepared.

In practice, a second generation copy output may often be used as an original to perform third generation copying. When copying is performed using the coefficient set $IK_2$ and the second generation copy output exhibits excellent reproduction of thin lines as in the original, it is expected that the same copy output as in the first generation copy output is obtained when the coefficient set $IK_1$ is used. In practice, however, since the contrast level is gradually decreased every time the generation copy cycle is repeated, the second generation copy output cannot exhibit the same characteristics as those of the original. That is, the coefficient sets $IK_1$ and $IK_2$ are not optimal coefficient sets for obtaining third generation copy outputs.

In this embodiment, a total of three coefficient sets are prepared to perform optimal edge emphasis and smoothing for third generation copying.

The block diagram of this embodiment is substantially the same as that in FIG. 1. The number of coefficient sets used in this embodiment is three, as described above. The first coefficient set $IK_1$ and the second coefficient set $IK_2$ are identical to those used in the first embodiment. A third coefficient set $IK_3 = (k_{13}, k_{23}, k_{33})$ is set complementary to the second coefficient set so as to optimize the reproducibility of characters and thin lines and smoothness of an image when a second generation copy output is used as an original to perform third generation copying.

A selection switch 40 can set a nominal copy mode, a second generation copy mode, or a third generation copy mode. The user can select any one of these modes in accordance with the type of original. When the third generation copy mode is set, a beautiful copy image which preserves clearness and smoothness of the original can be obtained.

Furthermore, in this embodiment, coefficient sets for the forth, the fifth, and subsequent generations may be prepared.

Still another embodiment of the present invention will be described bellow.

In the above embodiment, the coefficient set $IK_2$ or $IK_3$ is provided so that the copy output becomes best when a copy output obtained in the normal copy mode with the coefficient set $IK_1$ is used as an original.

When the second or third coefficient set $IK_2$ or $IK_3$ is used erroneously to perform copying for a normal original, and when this copy output is used as an original to repeat copying, a copy having excellent reproducibility of thin lines and optimal smoothness of an image cannot be obtained. This embodiment eliminates this drawback.

The block diagram of this embodiment is substantially the same as that in FIG. 1. A fourth coefficient set $IK_4 = (k_{14}, k_{24}, k_{34})$ is prepared in addition to the coefficient sets $IK_1$, $IK_2$, and $IK_3$. The fourth coefficient set $IK_4$ is complementary to the second coefficient set so as to obtain excellent reproducibility of character and thin lines and optimal smoothness of an image when a copy output obtained by erroneously copying an original with the second coefficient set $IK_2$ is used as an original to obtain a second generation copy output.

With this arrangement, even if multi-generation copying is performed using an erroneously obtained copy output as an original, the user can select a desired mode corresponding to the type of original, thereby preserving excellent reproducibility of characters and thin lines and optimal smoothness of an image.

In this embodiment, a fifth coefficient set $IK_5$ optimal for an original erroneously copied using the coefficient set $IK_3$ may be further added to the group of coefficient sets.

Use of common coefficients in the edge emphasis & smoothing circuits for the C, M, Y, and Bk color signals has been described above. However, different coefficient sets may be used for all color signals to obtain a higher resolution.

In the above embodiment, in order to change the degrees of edge emphasis and smoothing, the coefficients $k_1$, $k_2$, and $k_3$ are changed at the time of calculations of the respective component signals. However, the present invention is not limited to this technique.

For example, in order to change the degree of edge emphasis, the following equation, i.e., $$E = f(i,j) - S$$

may be substituted with the following equation:

$$E = k_4 \cdot f(i,j) - k_5 \cdot S$$

and the coefficient $k_4$ or $k_5$ may be changed.

The following equation for obtaining a smoothing output S, i.e., $$S = \frac{1}{9} \{ f(i-1, j-1) + f(i, j-1) + f(i+1, j-1) + $$
$$f(i-1, j) + f(i, j) + f(i+1, j) + $$
$$f(i-1, j+1) + f(i, j+1) + f(i+1, j+1) \}$$

may be substituted with the following equation:

$$S = \frac{1}{\sum_{k=6}^{14} K_K} \cdot \{ \times K_6 \cdot f(i-1, j-1) + K_7 \cdot $$
$$f(i, j-1) + K_8 \cdot f(i+1, j-1) + K_9 \cdot f(i-1, j) + $$
$$K_{10} \cdot f(i, j) + K_{11} \cdot f(i+1, j) + K_{12} \cdot f(i-1, j+1) + $$
$$K_{13} \cdot f(i, j+1) + K_{14} \cdot f(i+1, j+1) \}$$

The coefficients $k_6$ to $k_{14}$ may be changed to change the degree of smoothing. The smoothing matrix is not limited to a size of 3×3, and the size may be changed to change the smoothing effect. In this case, the smoothing effect is increased when the matrix size is increased.

In the above embodiment, an optimal resolution is obtained by the image processing systems for performing edge emphasis, smoothing, and the like. However, the optimal resolution may be obtained by an image read optical system. For example, an optimal resolution may be obtained by changing CCD filter characteristics, a CCD numerical aperture or a defocus amount.

The present invention is not limited to a digital or color system, but is also applicable to a monochrome copying machine.

The present invention is particularly effective for a bubble-jet head of ink-jet heads as record heads. Since a bubble-jet record head generally performs binary recording, a resolution tends to be lowered in generation copying. According to the present invention, however, by setting parameters for obtaining an optimal resolution in multi-generation copying, quality of generation copies can be improved even in the bubble-jet system.

Typical arrangements and principles of the bubble-jet system preferably adopt fundamental principles disclosed in U.S. Pat. Nos. 4,723,129 and 4,740,796. The bubble-jet system can be applied to either of a so-called on-demand system and a so-called continuous system. In particular, in the on-demand system, at least one drive signal for causing an abrupt temperature rise exceeding film boiling in correspondence with recording information is applied to electrothermal conversion elements arranged in correspondence with a sheet containing a liquid (ink) or liquid paths. Heat energy is generated by each electrothermal conversion element, and film boiling is caused on a heat-generating surface of a record head. As a result, a bubble can be effectively formed in a liquid (ink) in a one-to-one correspondence with the drive signal. Growth and contraction of this bubble cause ejection of the liquid (ink) through the corresponding ejection opening, thereby forming at least one droplet. If this drive signal is a pulse signal, growth and contraction of the bubble are instantaneously and appropriately performed. Therefore, ejection of the liquid (ink) can be performed at high speed.

As described above, according to this embodiment, smoothness and clearness of an original are maintained in generation copying, thereby improving quality of generation copies.

Figure 2:
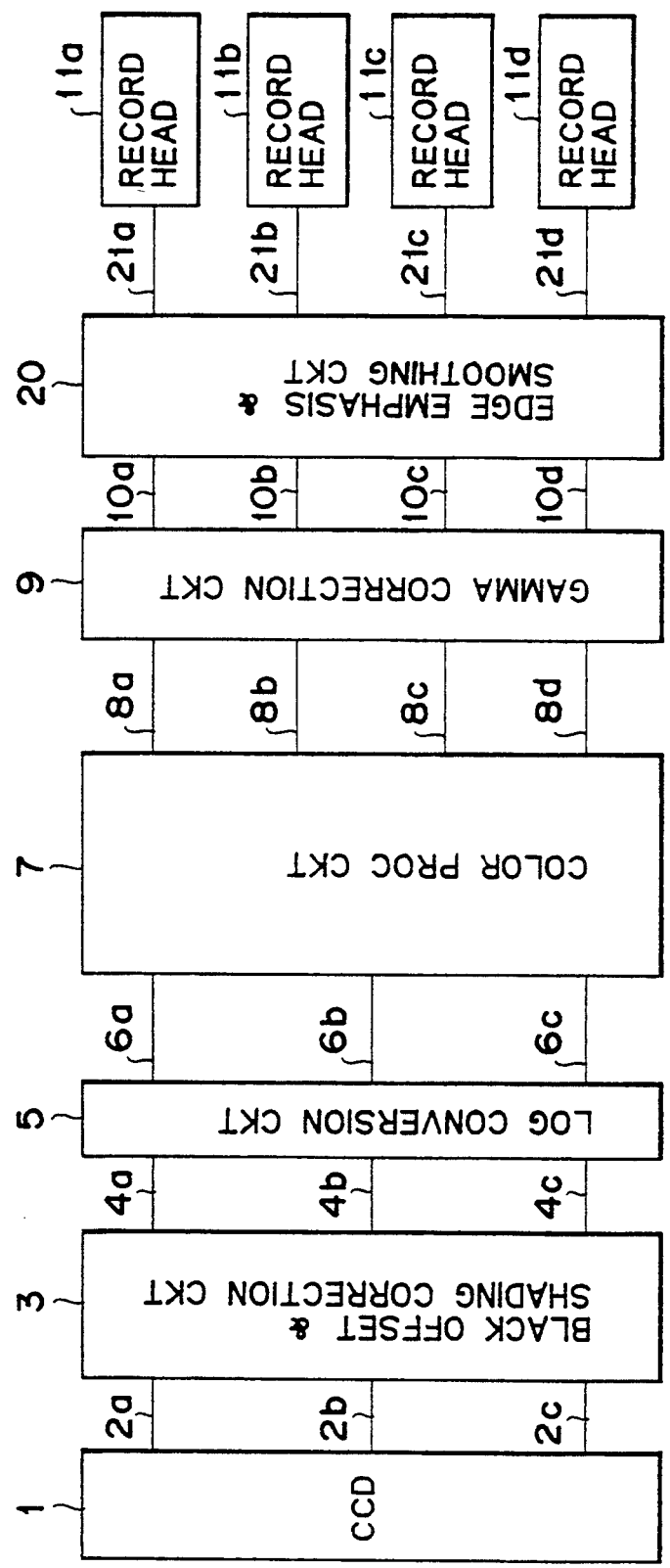
FIG. 2 is a block diagram showing a conventional copying apparatus.
Figure 4:
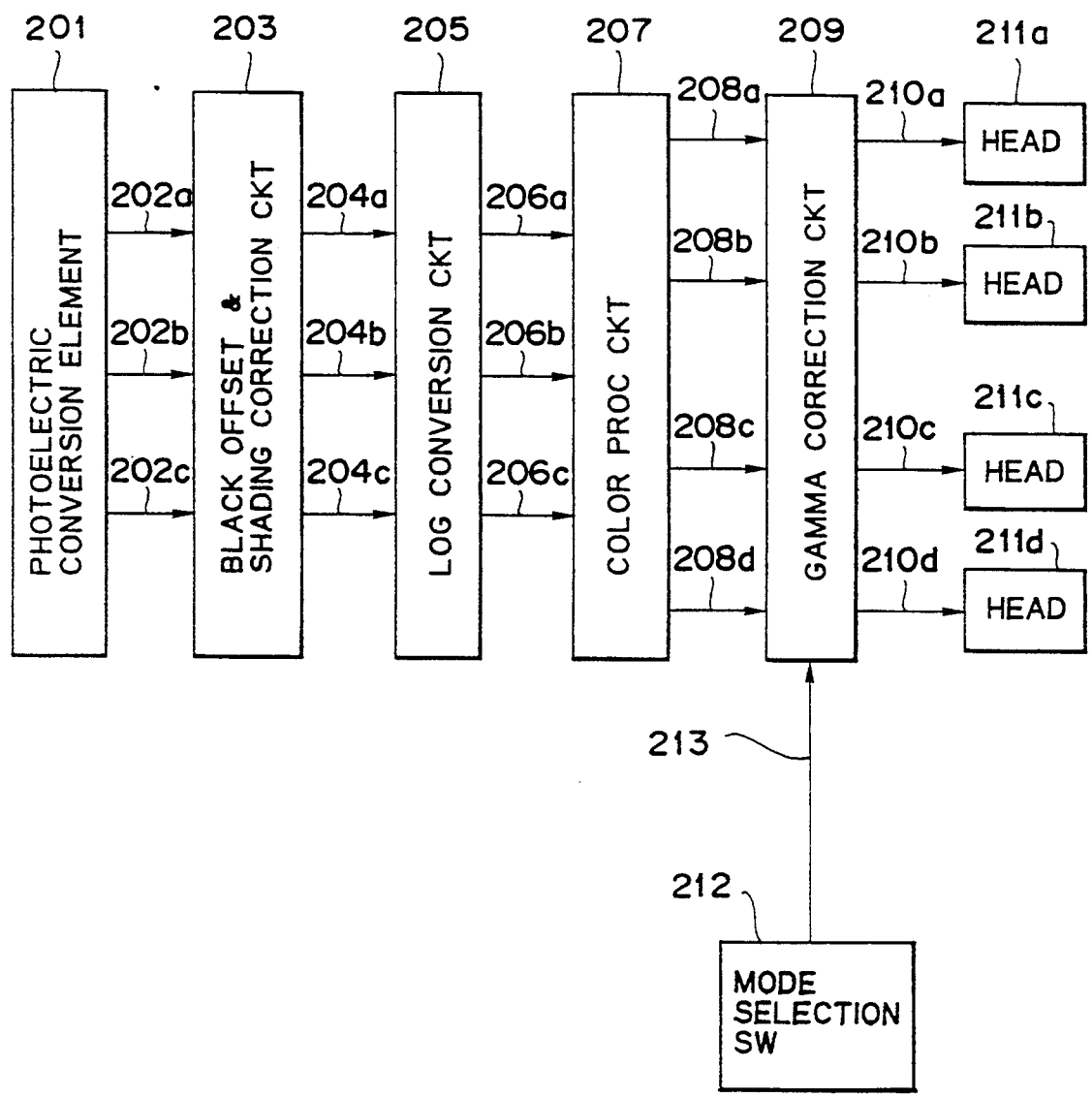
FIG. 4 is a block diagram of an image forming apparatus according to the second embodiment of the present invention.

FIG. 4 is a block diagram of a digital color copying machine according to the second embodiment of the present invention, showing an image signal flow. A mode selection switch 212 is arranged in the digital color copying machine of this embodiment. A mode selection signal 213 from this switch 212 is supplied to a gamma correction circuit 209 to select a gamma correction coefficient. Other arrangements of this embodiment are substantially the same as those in the conventional color copying machine shown in FIG. 2. The same reference numerals as in FIG. 2 denote the same parts in FIG. 4, and a detailed description thereof will be omitted unless otherwise specified.

The mode selection switch 212 outputs the mode selection signal 213 for selecting a gamma correction coefficient so that an image signal corresponding to an original density of 2.0 becomes a maximum value of 255 when a normal original (not a copy output as an original) is to be copied (i.e., the nominal copy mode) and outputs the mode selection signal 213 for selecting a gamma correction coefficient so that an image signal corresponding to an original density of 1.5 becomes a maximum value of 255 when a copy output is used as an original to perform copying (i.e., generation copy mode). In this embodiment, when a nominal original is to be copied, a relationship between an original density and an image signal is as represented by a solid line A in FIG. 5, and a relationship between the original density and an output density is as represented by a solid line C in FIG. 5. On the other hand, when a copy output is used as an original to perform copying, the gamma correction coefficient is changed by the signal 213 from the mode selection switch 212. A relationship between an original density and an image signal is as represented by a solid line D (FIG. 5) exhibiting saturation of the original density at the point of 1.5, and a relationship between the original density and an output density is as represented by a solid line E (FIG. 5) exhibiting saturation of the original density at the point of 1.5.

As a result, whether a normal original is used or a copy output is used as an original, the copy image density is kept almost unchanged. A decrease in image density upon repetition of the copying operations can be prevented.

The value of the updated gamma correction coefficient is determined in accordance with a maximum output density of a copy image. In this embodiment, the density is changed to 1.33 times (2.0/1.5). When maximum output densities of the C, M, Y, and Bk components are different from each other, the coefficient sets of the respective color components may be independently changed or updated.

A digital color copying machine according to the third embodiment of the present invention will be described with reference to FIG. 6. In this embodiment, a mode selection signal 213 from a mode selection switch 212 is input to a color processing circuit 207 to change masking coefficients $a_{11}$ to $a_{44}$. More specifically, when a normal original is to be copied (normal copy mode), the mode selection signal 213 for setting a masking coefficient so that an image signal corresponding to an image density of, e.g., 2.0 becomes a maximum value of 255 is output. However, when a copy output is used as an original to perform copying (generation copy mode), the mode selection signal 213 for setting a masking coefficient so that an image signal corresponding to an image density of, e.g., 1.5 becomes a maximum value of 255 is output. In this embodiment, when the original is copied, a relationship between an original density and an image signal is as represented by the solid line A in FIG. 5, and a relationship between an original density and an output density is as represented by a solid line C in FIG. 5. On the other hand, when a copy output is used as an original to perform copying, the masking coefficient is changed by the signal 213 from the mode selection switch 212, as described above. A relationship between an original density and an image signal is as represented by a solid line D in FIG. 5, and a relationship between the original density and an output density is as represented by a solid line E in FIG. 5. Therefore, the same effect as in the second embodiment is apparently obtained. Other arrangements of this embodiment are substantially the same as those in the second embodiment. The same reference numerals as in the second embodiment denote the same parts in the third embodiment, and a detailed description thereof will be omitted.

Figure 5:
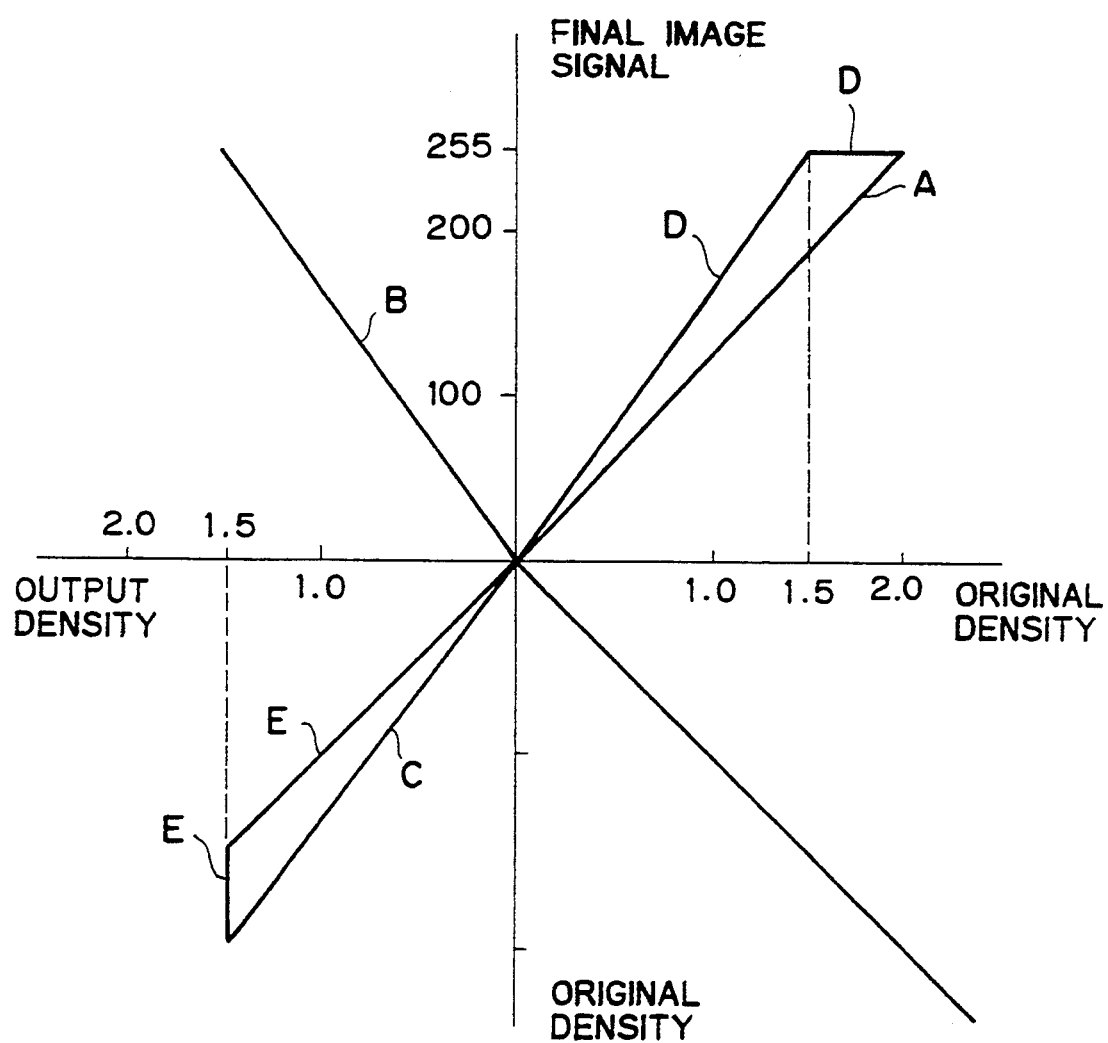
FIG. 5 is a graph for explaining a relationship between an original density and an output density in an image forming apparatus of the present invention.
Figure 6:
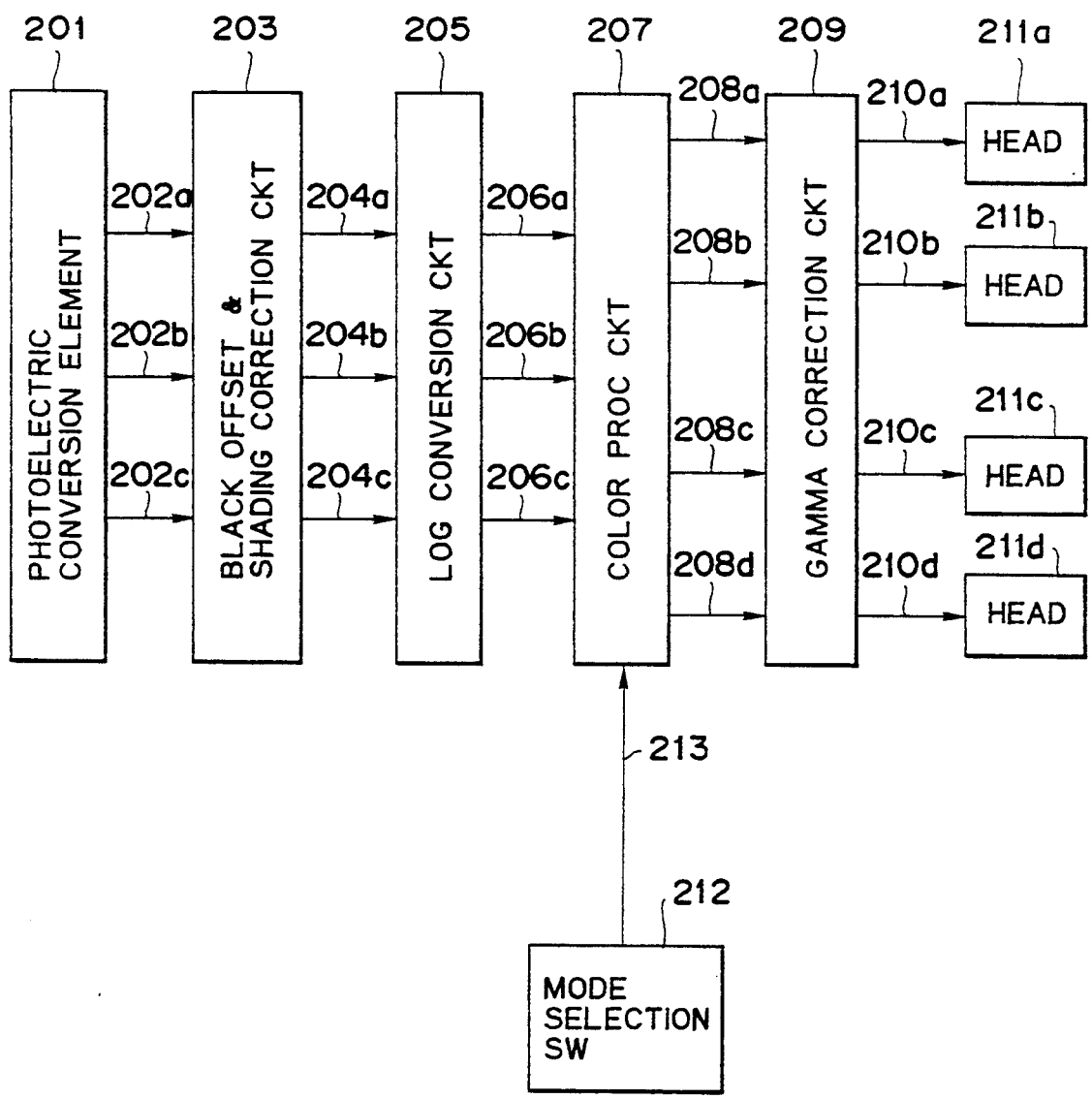
FIG. 6 is a block diagram showing an image forming apparatus according to the third embodiment of the present invention.

In the third embodiment, the relationship between the original density and the final image signal is as represented by the solid line D in FIG. 5. However, the masking coefficient may easily be set to finely change color reproducibility. In general, color reproducibility of a color copy is not perfect, and colors are slightly changed. When a copy output is copied again, a change in its color is amplified and becomes conspicuous. In this embodiment, since this embodiment can set the masking coefficient so as to correct a change in color upon updating of the masking coefficient, a change in color in addition to a change in density can also be prevented.

The fourth embodiment of the present invention will be described below. In this embodiment, the gamma coefficient and the masking coefficient are not updated. Instead, a standard black board is changed at the time of black offset correction, thereby obtaining the same effect as in the second and third embodiments.

Figure 7:
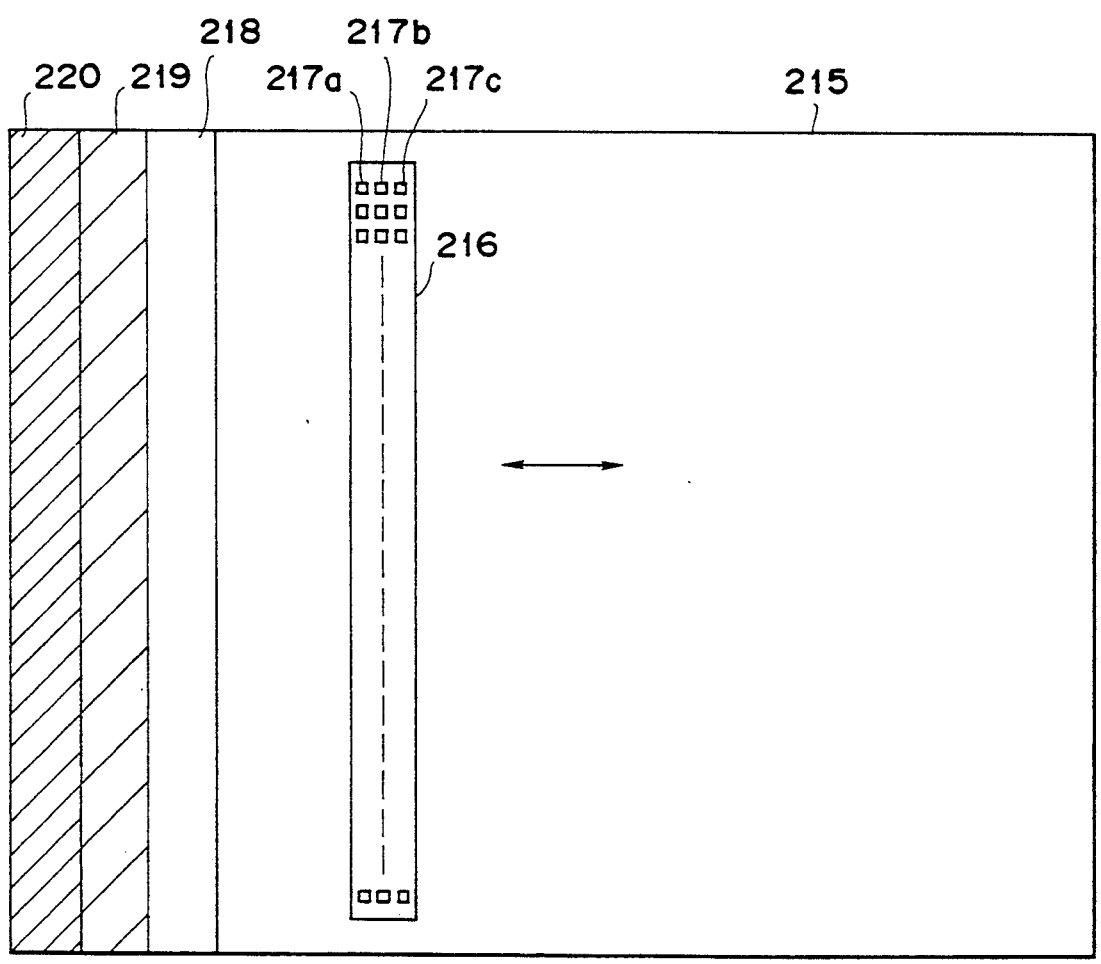
FIG. 7 is a schematic rear view of an original table and a CCD serving as a photoelectric conversion element in an image forming apparatus according to the fourth embodiment of the present invention.
Figure 8:
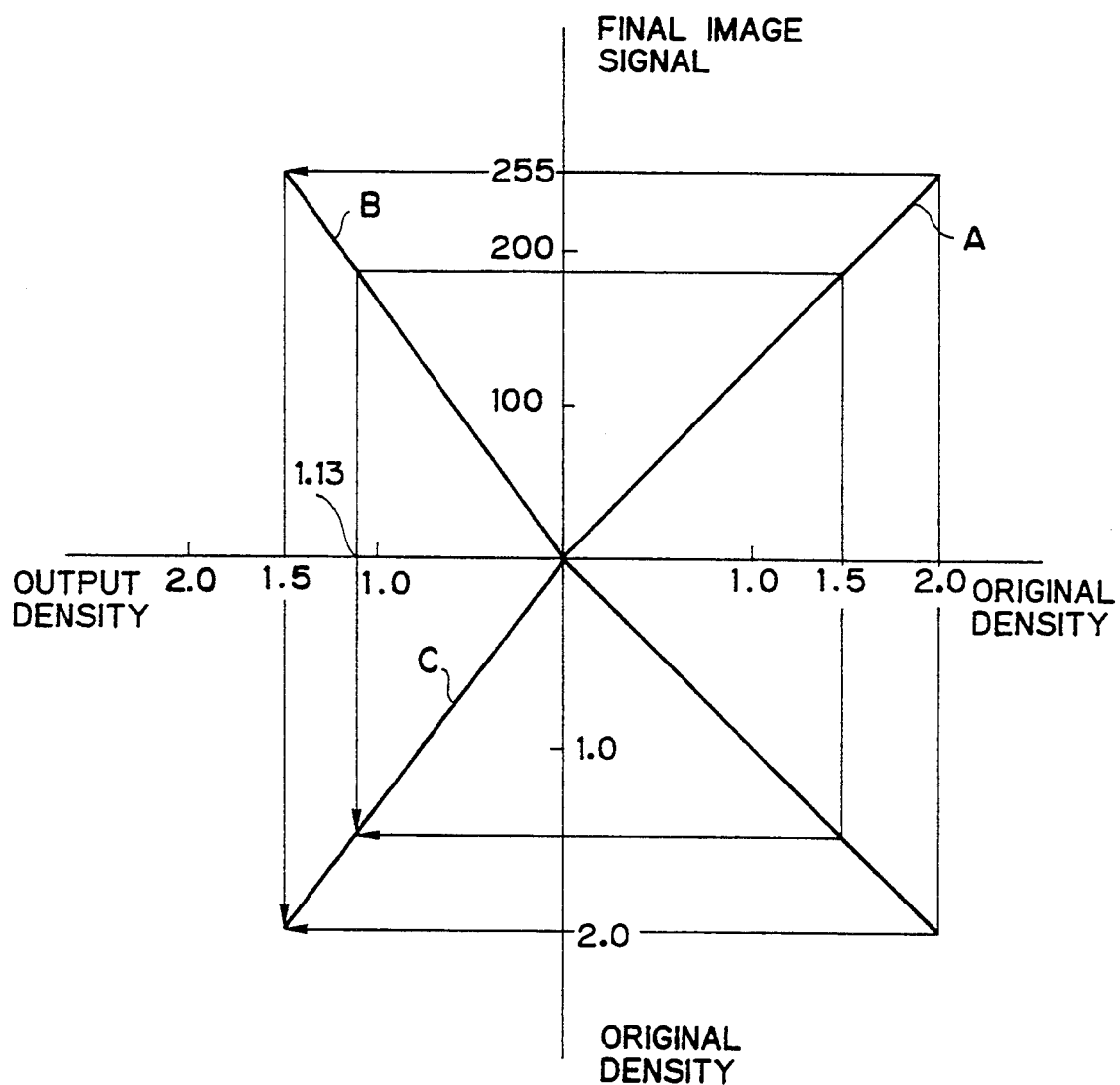
FIG. 8 is a graph showing a relationship between an original density and an output density in a conventional digital color copying machine.

FIG. 7 is a schematic rear view of an original table and a CCD (Charge-Coupled Device) serving as a photoelectric conversion element as in the above embodiment. A CCD 216 has about 5,000 R read pixels 217a, about 5,000 G read pixels 217b, and about 5,000 B read pixels 217c at a density of 16 pixels/mm. The CCD 216 is driven in a direction of the arrow in FIG. 7 by a motor (not shown) to receive light reflected by an original. The CCD 216 converts light into an electrical signal. In this embodiment, the CCD 216 is arranged to read a color original having a maximum of A3 size. The read pixels 217a, 217b, and 217c are located on the lower surface of the CCD 216 in FIG. 7 and are not seen from the top. However, these read pixels are illustrated for the sake of descriptive convenience. A standard white board 218, a first standard black board 219, and a second standard black board 220 are adhered at or near one end of an original glass table 215.

An operation of this embodiment will be described below.

In a normal copy mode for forming a color copy from a normal original (not a copy output), prior to reading of the original, the CCD 216 reads the first standard black board 219, and a CCD output A is stored in units of pixels. The density of the first standard black board 219 is 2.0. The standard white board 218 having a density of 0.07 is read, and its output B is stored in units of pixels. When a value obtained by actually reading an original is given as X, a black offset & shading correction circuit 203 is converted as follows:

$$X' = \frac{255}{B - A}(X - A)$$

and image processing is performed. If the original density is 2.0, a read value is X=A, so that X'=0 which is an output corresponding to the darkest portion.

Each parameter is set so that a final image output upon logarithmic conversion, color correction, and gamma correction for X'=0 becomes the maximum value of 255. An image signal for an original density of 2.0 becomes the maximum value of 255. Therefore, a relationship between the original density and the image signal is represented by the solid line A of FIG. 5.

To the contrary, when a color copy is obtained again by using a copy output as an original (generation copy mode), a motor for driving the CCD 216 is controlled in accordance with a signal from a mode selection switch (not shown), and a standard black board read for black offset correction serves as the second standard black board 220. The second standard black board 220 has its density almost equal to a maximum recording density of a head. In this embodiment, since the maximum recording density of the head is 1.5, the density of the second standard black board 220 is set to 1.5. For this reason, when an original density is 1.5, condition X'=0 is satisfied, and a final image signal has a maximum value of 255. A relationship between the original density and the image signal is as represented by the solid line D in FIG. 5, and this embodiment obtains the same effect as in the second and third embodiments.

With this arrangement, variable gamma and masking coefficients need not be stored, and the circuit and memory capacities can be reduced. In addition, standard black boards for C (cyan), M (magenta), and Y (yellow) may be prepared if these color components are independently updated.

In the above embodiment, the original density corresponding to the maximum value of the image signal at the time of copying from a normal original is set to 2.0, and the maximum density of the image recording unit is set to 1.5. However, the present invention is not limited to these values. The same effect as the previous embodiments can be expected if an original density corresponding to the maximum value of the image signal is higher than the maximum density of the image recording unit. However, the conventional problem typically occurs when the maximum density of the print original is 1.8 or more and the maximum density of the image recording unit is 1.8 or less. When the present invention is applied to an image forming apparatus such as a copying machine having an image recording unit whose maximum density is 1.8 or less, the resultant effect is further increased.

The present invention is not limited to an ink-jet digital color copying machine, but is applicable to various types of image forming apparatuses of a digital electronic electrophotographic scheme, an electrostatic recording scheme, and a thermal transfer scheme.

As described above, according to the embodiments described above, a copy is obtained from a copy output in a copy mode wherein the original density corresponding to the maximum value of the image signal is set to be almost equal to the maximum density of the image recording unit. Even if a copy output is used as an original to perform copying or is repeatedly copied, poor readability caused by an excessive low density can be advantageously prevented.

Figure 9:
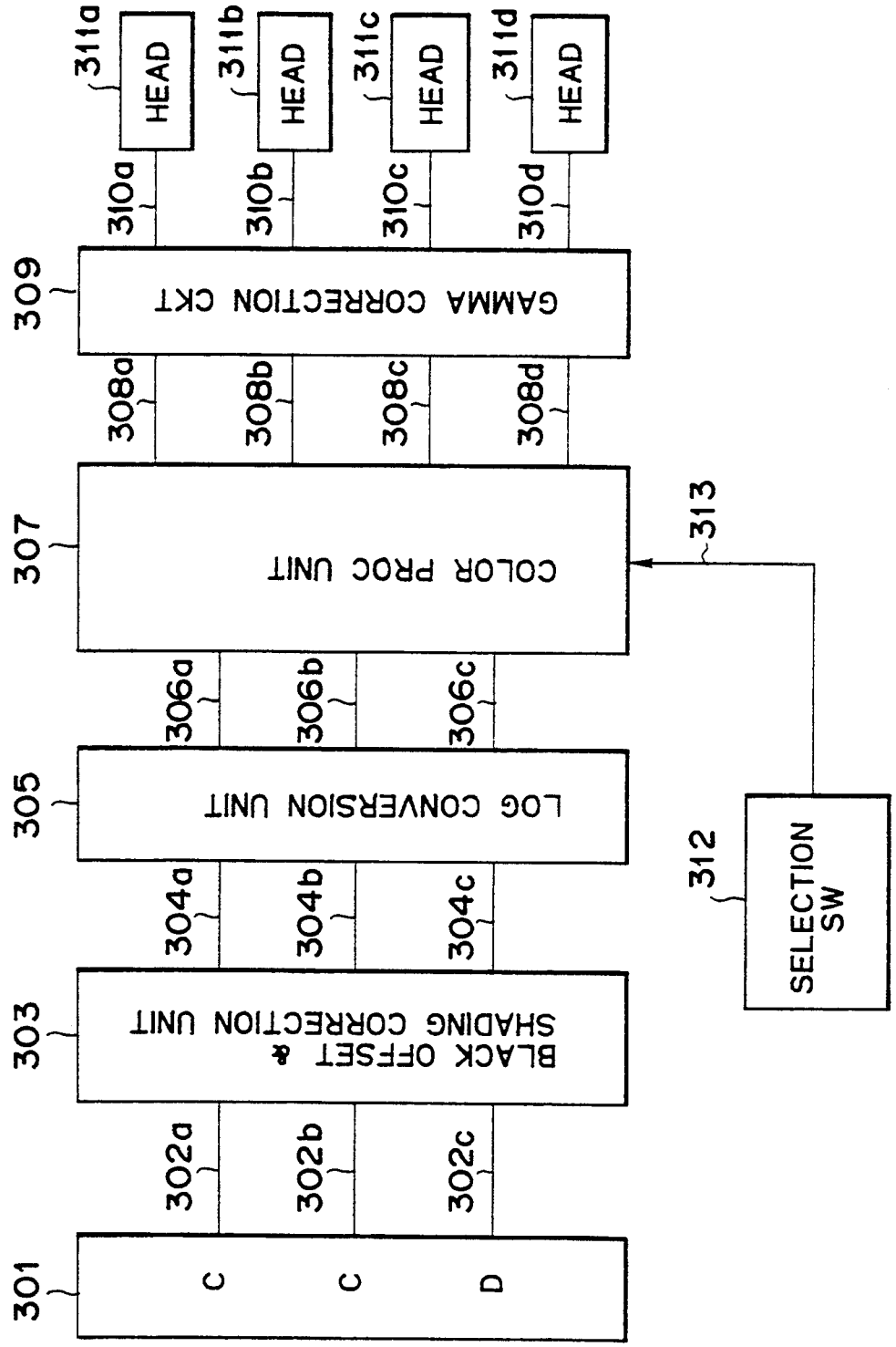
FIG. 9 is a block diagram of a color copying apparatus according to the fifth embodiment of the present invention.

FIG. 9 is a block diagram of a color copying apparatus according to the fifth embodiment of the present invention. Referring to FIG. 9, a CCD 301 outputs R, G, and B signals 302a, 302b, and 302c to a black offset & shading correction unit 303. The black offset & shading correction unit 303 outputs shading-corrected R, G, and B signals 304a, 304b, and 304c to a log conversion unit (to be referred to as a LOG unit hereinafter) 305. The LOG unit 305 outputs C (cyan), M (magenta), and Y (yellow) density signals 306a, 306b, and 306c to a color processing circuit 307. The color processing unit 307 outputs color-processed C, M, Y, and Bk signals to a gamma correction unit 309. The gamma correction unit 309 outputs gamma-corrected C, M, Y, and Bk signals 310a, 310b, 310c, and 310d to record heads 311a to 311d. The record heads 311a to 311d serve as cyan, magenta, yellow, and black record heads.

The color processing unit 307 in FIG. 9 is a masking unit.. Two sets of parameters $a_{11}$ to $a_{44}$ are stored, and are selectively used by a selection signal 313 input from a selection switch 312.

A first parameter set $F_1$ consists of parameters $a_{11}$, $a_{12}$, ..., $a_{43}$, $a_{44}$ obtained by the same method as the conventional method. More specifically, a sum of the squares of the color differences between an original ($X_1$, ..., $X_n$) and its copy ($Y_1$, ..., $Y_n$) is obtained by the following equation:

$$E_{Y-X} = \sum_{k=1}^{n} E_{abk}^{2*} \tag{5}$$

The parameters $a_{11}$ to $a_{44}$ are determined to minimize the sum of the squares of the color differences. A typical determination method is a method using a method of least error squares and is known to those skilled in the art, and a detailed description thereof will be omitted.

A second parameter set $F_2$ consists of parameters $a_{11}'$, $a_{12}'$, ..., $a_{44}'$ obtained as follows.

These parameters are set such that a copy output ($X_1$, ..., $X_n$) represents a color most similar to that of the original when copying is performed by using a copy output ($Y_1$, ..., $Y_n$) as an original.

When a copy output obtained by copying a copy output ($Y_1$, ..., $Y_n$) as an original in accordance with the second parameter set $F_2$ is given as ($Y_1'$, ..., $Y_n'$), the parameter set $F_2$ is determined to minimize the color difference between the copy output ($Y_1'$, ..., $Y_n'$) and the original ($X_1$, ..., $X_n$) in accordance with equation (6) below:

$$\begin{aligned}
\Delta E_{Y-X} &= \sum_{k=1}^{n} \Delta E_{abk}^{2*} \\
&= (L^*_{Y1}{}' - L^*_{X1})^2 + (a^*_{Y1}{}' - a^*_{X1})^2 + \\
&\quad (b^*_{Y1}{}' - b^*_{X1})^2 + \ldots + (L^*_{Yn}{}' - L^*_{Xn})^2 + \\
&\quad (a^*_{Yn}{}' - a^*_{Xn})^2 + (b^*_{Yn}{}' - b^*_{Xn})^2
\end{aligned} \tag{6}$$

The parameter set $F_2 = (a_{11}', a_{12}', \ldots, a_{44}')$ is obtained by using the known method of least squares so as to minimize the value of the above equation. When the parameter set $F_1$ is predetermined, the values $(Y_1', \ldots, Y_n')$ and $(X_1, \ldots, X_n)$ are known, so that the above sum can be easily obtained.

The main part of the fifth embodiment will be briefly described below.

Figure 10:
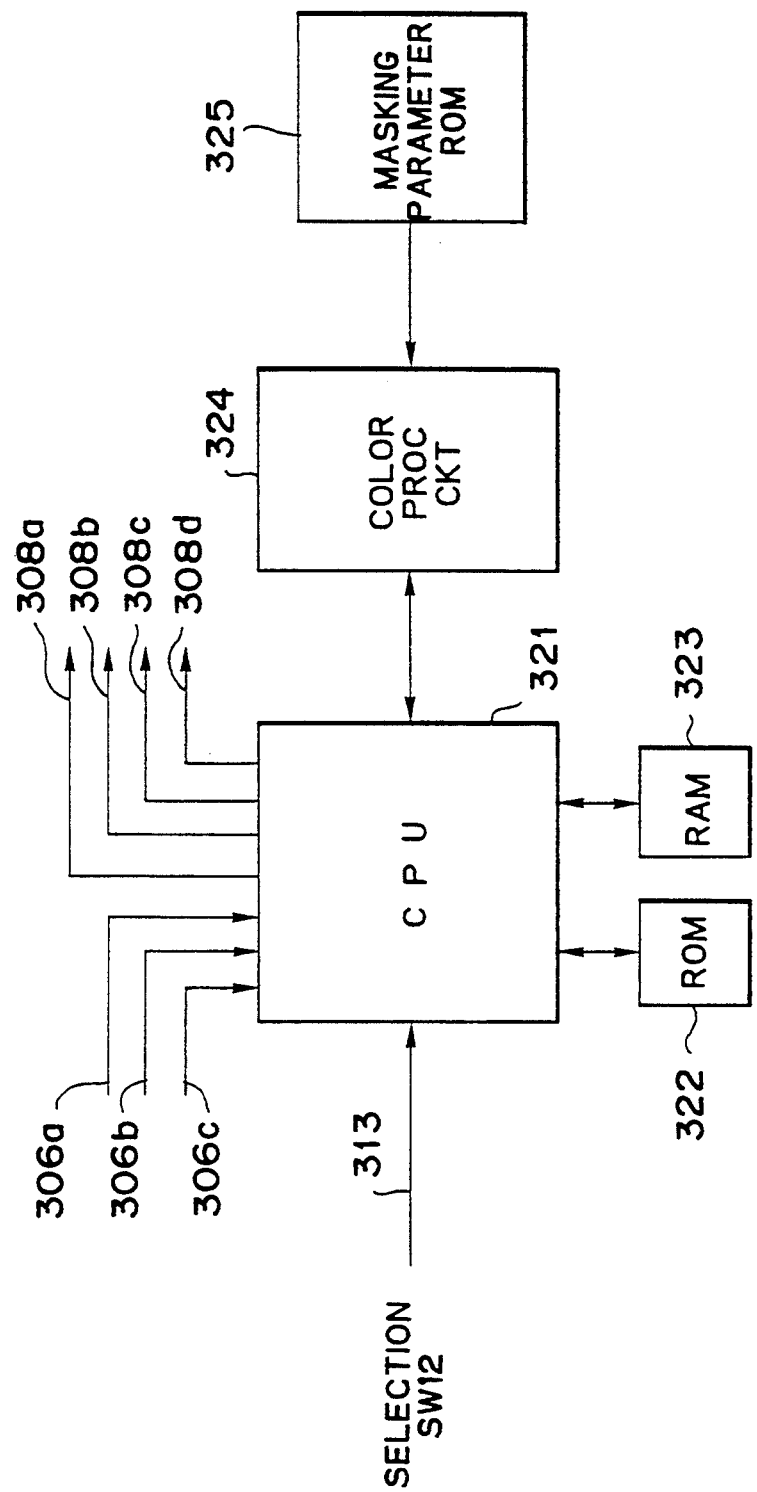
FIG. 10 is a block diagram showing an arrangement of a color processing unit 7 according to the fifth embodiment of the present invention.

FIG. 10 is a block diagram showing an arrangement of the color processing unit 307 of the fifth embodiment. The color processing unit 307 includes a CPU 321 for controlling the overall operation of the color processing unit 307, a ROM 322 for storing programs of a flow chart in FIG. 11 to operate the CPU 321, and a RAM 323 serving as a work area used during execution of each program. A masking parameter ROM 325 stores the masking parameter set $F_1$ set in a normal copy mode in the fifth embodiment and a masking parameter set $F_2$ set in a generation copy mode in this embodiment. A color processing circuit 324 is operated in actual color processing in accordance with a selected masking parameter set. Note that an appropriate masking parameter set is selected by the selection signal 313 from the selection switch 312.

Figure 11:
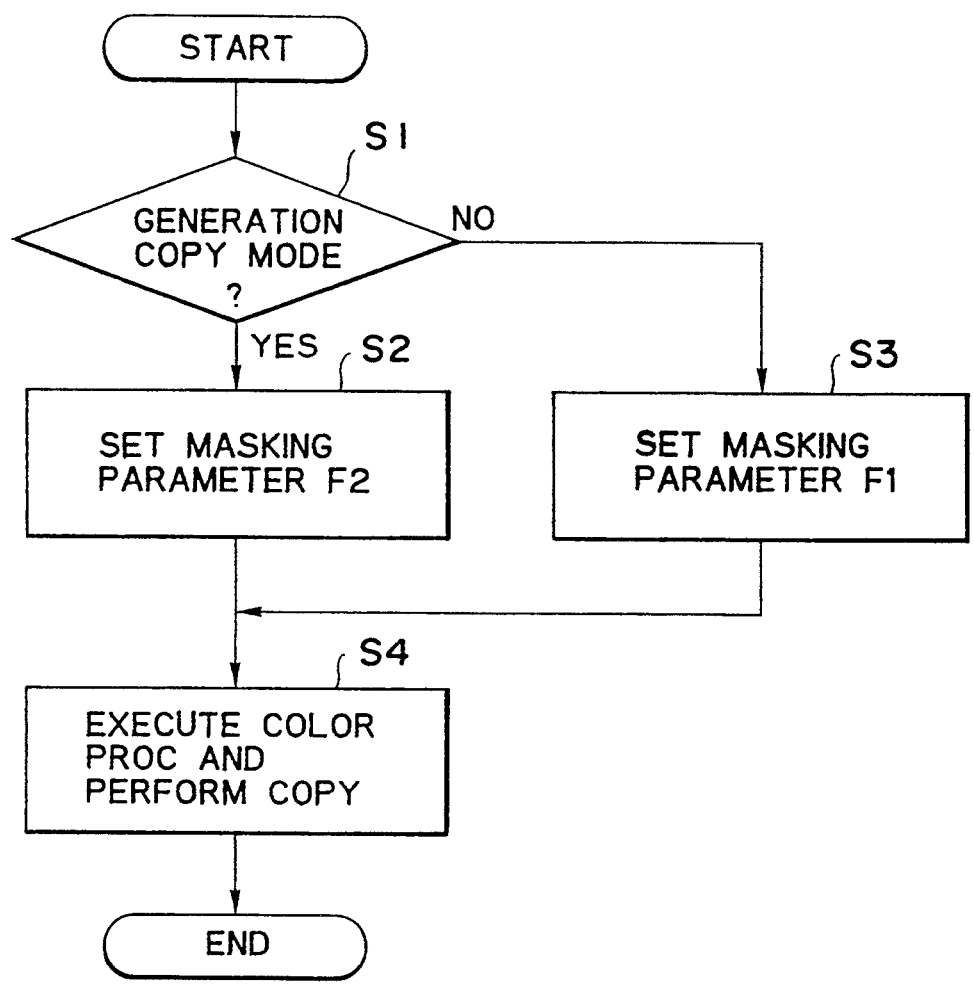
FIG. 11 is a flow chart for explaining an operation of the color processing unit 7 according to the fifth embodiment of the present invention.

FIG. 11 is a flow chart for explaining an operation of the color processing unit 307 of the fifth embodiment.

In a normal application using a print original or a handwritten original, when the user sets the selection switch 312 to the normal copy mode position, the CPU 321 causes the color processing circuit 324 to select the masking parameter set $F_1$ in accordance with the selection signal 313 representing the normal copy mode (steps S1 and S3).

At the time of copying, i.e., at the time of color processing by the color processing unit 307, an average color copy is obtained in color reproduction for the normal original (step S4).

When a copy is to be obtained by copying a copy output, the user operates the selection switch 312 to set a generation copy mode. The masking parameter set $F_2$ is selected by the selection signal 313 representing the generation copy mode in accordance with the above operation (steps S1 and S2). In this state, copying is performed using the copy output as an original, and the copy color exhibits a color similar to the color of the original (step S4). Therefore, an increase in color deterioration caused by multi generation copying can be suppressed. Even if copying is repeated, excellent color reproducibility can be maintained.

As described above, according to the fifth embodiment, there are provided the first parameter set obtained to minimize a color difference between an original X and an output image $Y_1$ obtained by copying the original X, at least one parameter set obtained to minimize a color difference between an output image $Y_{n+1}$ obtained by copying a copy output image $Y_n$ (n>1) serving as an original and the original X or the output image $Y_1$, and a means for selecting one of the plurality of parameter sets, thereby preserving tints even in generation copying.

The sixth embodiment of the present invention will be described below.

The fifth embodiment provides the parameter sets for adjusting a color of a first copied original, i.e., the second generation copy output to come close to the color of the original. In practice, second generation copies are often used as originals to obtain color copies. If a second generation copy exhibits the same color as that of the original in accordance with the parameter set $F_2$, it is expected that a copy obtained using the parameter set $F_1$ has the same color as that of the first generation copy. In practice, however, the second generation copy exhibits a color slightly different from that of the original. When the second generation copy is used as an original and is copied using the parameter set $F_1$, a color difference is further increased.

In the sixth embodiment, three or more parameter sets are provided. Even if second or subsequent generation copies are used as originals, the colors of the copy outputs can be restored to the original colors.

The block diagram of the sixth embodiment is the same as that of FIGS. 9 and 10, and a detailed description of the sixth embodiment will be omitted. In the sixth embodiment, the number of masking parameter sets stored in a masking parameter ROM 325 is 3 (to be described in detail below).

More specifically, a first parameter set $F_1$ and a second parameter set $F_2$ are identical to those used in the fifth embodiment. A third parameter set $F_3$ is obtained as follows.

Assume that an output obtained by copying an original $(X_1, \ldots, X_n)$ by the parameter set $F_1$ is given as $(Y_1, \ldots, Y_n)$, and that an output obtained by copying the output $(Y_1, \ldots, Y_n)$ as an original is given as $(Y_1', \ldots, Y_n')$. The output $(Y_1', \ldots, Y_n')$ is copied to reduce a color difference from the original $(X_1, \ldots, X_n)$, but it is impossible to obtain identical colors therebetween. A color obtained by copying the output $(Y_1', \ldots Y_n')$ by the parameter set $F_1$ is different from that of the output $(Y_1, \ldots, Y_n)$. When such multi-generation copying is repeated, color differences between the inputs and outputs are increased.

The parameter set $F_3$ is set so that a color difference between the original $(X_1, \ldots, X_n)$ and the corresponding copy output $(Y_1, \ldots, Y_n)$ is minimized when an output obtained by copying the output $(Y_1', \ldots, Y_n')$ as an original in accordance with the third parameter set $F_3$ is $(Y_1, \ldots, Y_n)$. More specifically, for this purpose, equation (7) below is used:

$$\Delta E_{Y-X} = \sum_{k=1}^{n} \Delta E_{abk}^{2*}$$
$$= (L^*_{Y1} - L^*_{X1})^2 + (a^*_{Y1} - a^*_{X1})^2 +$$
$$(b^*_{Y1} - B^*_{X1})^2 + \ldots + (L^*_{Yn} - L^*_{Xn})^2 +$$
$$(a^*_{Yn} - a^*_{Xn})^2 + (b^*_{Yn} - b^*_{Xn})^2$$

(7)

The masking coefficients are determined to minimize the above difference.

When the parameter sets $F_1$ and $F_2$ are determined, the above equation can be calculated because the values $(Y_1, \ldots, Y_n)$ are known.

The selection switch 312 can select a normal copy mode, a first generation copy mode, and a second generation copy mode. The user can select one of these copy modes. Even if a second generation copy output is used as an original, tints of the copy output can be preserved.

As a modification of the sixth embodiment, parameter sets $F_4$ and $F_5$ corresponding to the third generation copy and the fourth generation copy may be prepared.

The seventh embodiment of the present invention will be described.

In the fifth and sixth embodiments, the parameter sets for restoring the original colors as output colors when generation copy outputs copied by the normal copy mode parameter set $F_1$ are used as originals are prepared. If a normal original is erroneously copied in the generation copy mode using the parameter set $F_2$ or $F_3$, and the corresponding copy output is used as an original and copied, the original tints cannot be restored.

This is improved in the seventh embodiment.

The block diagram of the seventh embodiment is the same as that of FIGS. 9 and 10. In this embodiment, a color processing unit 307 has a fourth parameter set $F_4$ in addition to parameter sets $F_1$ to $F_3$. The fourth parameter set $F_4$ is determined as follows.

Assume that a copy output obtained by erroneously copying an original $(X_1, \ldots, X_n)$ in accordance with a parameter set $F_2$ is given as $(Z_1, \ldots, Z_n)$. This copy output $(Z_1, \ldots, Z_n)$ is used as an original and is copied using the parameter set $F_4$ to obtain a copy output as $(Z_1', \ldots, Z_n')$. The parameter set $F_4$ is set as follows:

$$\Delta E_{Z-X} = \sum_{k=1}^{n} \Delta E_{abk}^{*2} \qquad (8)$$

$$= (L^*_{Z1} - L^*_{X1})^2 + (a^*_{Z1} - a^*_{X1})^2 +$$

$$(b^*_{Z1} - B^*_{X1})^2 + \ldots + (L^*_{Zn} - L^*_{Xn})^2 +$$

$$(a^*_{Zn} - a^*_{Xn})^2 + (b^*_{Zn} - b^*_{Xn})^2$$

The value in equation (8) is determined to be minimum.

The user selects a mode in correspondence with the type of original to selectively use the parameter sets.

As is apparent from the above description, even if a copy output obtained by erroneously using the parameter set $F_2$ is used as an original to perform generation copying, original tints can be faithfully preserved.

As a modification of the seventh embodiment, a parameter set $F_5$ for restoring the original colors upon copying of an original by erroneously using the parameter set $F_3$ may be additionally provided.

In the fifth to seventh embodiments, the parameter sets are optimized using a known method of least squares. However, parameters may be experimentally obtained. In this case, for example, the parameters $a_{11}$ to $a_{44}$ of the parameter set $F_1$ are adjusted so that the a color of an output $(Y_1, \ldots, Y_n)$ obtained by copying an original $(X_1, \ldots, X_n)$ comes close to that of the original $(X_1, \ldots, X_n)$. The parameter set $F_2$ is experimentally obtained so that a color of the copy output $(Y_1', \ldots, Y_n')$ obtained by copying the copy output $(Y_1, \ldots, Y_n)$ comes close to that of the original $(X_1, \ldots, X_n)$.

The target tints are those of the original $(X_1, \ldots, X_n)$. However, except for the parameter set $F_1$, the target tints may be those of the first generation copy $(Y_1, \ldots, Y_n)$.

The color processing parameter set of each of the C, M, Y, and Bk components is exemplified by a 4×4 masking matrix consisting of the coefficients $a_{11}$ to $a_{44}$. However, a 3×3 masking matrix for each of C, M, and Y components may be used. Alternatively, known UCR (Under Color Removal) or inking parameters may be used.

In addition, the coefficients $a_5$ to $a_8$ for the C, M, Y, and Bk components in the gamma correction unit may be used.

All parameters associated with calculations for adjusting colors are incorporated in the scope of the present invention.

As has been described above, according to the embodiments of the present invention, tints can be maintained at high level.

What is claimed is:

1. An image processing apparatus comprising:
   a) input means for scanning an original image and generating image data;
   b) processing means for processing the image data generated by said input means; and
   c) output means for forming a reproduction image in accordance with the image data processed by said processing means,
   wherein, in a first mode said input means scans a first original image and generates first image data, said processing means processes the first image data by using a first processing parameter and said output means forms a first reproduction image, and
   in a second mode, said input means scans the first reproduction image formed by said output means and generates second image data, said processing means processes the second image data by using a second processing parameter and is suitable for processing the second image data generated by said input means, and said output means forms a second reproduction image.

2. An apparatus according to claim 1, wherein said input means comprises an image reader having a CCD sensor.

3. An apparatus according to claim 1, wherein said processing means performs density correction of the input image data.

4. An apparatus according to claim 1, wherein said processing means performs color correction of the input image data.

5. An apparatus according to claim 1, wherein said processing means performs conversion of spatial frequency characteristics of the input image data.

6. An apparatus according to claim 1, wherein said output means includes a plurality of ports for ejecting ink, and heat energy generating means, formed in correspondance with said plurality of ports, for causing a state change by ink heating, ejecting the ink from each of said plurality of ports on the basis of the state change, and forming at least one flying liquid droplet.

7. An apparatus according to claim 1, wherein said output means includes means for forming a latent image on a photosensitive body and developing the latent image by using a recording agent.

8. An apparatus according to claim 1, wherein the second mode is a generation copy mode.

9. An apparatus according to claim 1, wherein the first mode is a normal copy mode.

10. An apparatus according to claim 1, wherein said processing means includes section means for manually selecting said first mode or said second mode.

11. An apparatus according to claim 1, wherein said processing means includes memory means for storing said first processing parameter and said second processing parameter.

12. An image processing method comprising the steps of:
   a) scanning an original image and generating image data;
   b) processing the generated image data; and c) forming a reproduction image in accordance with the processed image data, wherein, in a first mode, first image data which is generated by scanning a first original image is processed by using a first processing parameter and a first reproduction image is formed in accordance with the processed first data, and in a second mode, second image data which is generated by scanning the first reproduction image is processed by using a second processing parameter, which is different from the first processing parameter and is suitable for processing the second image data obtained from the first reproduction image and a second reproduction image is formed in accordance with the processed second image data.

13. A method according to claim 12, further comprising the step of manually selecting the first mode or the second mode.

14. A method according to claim 12, wherein said processing step uses a memory which stores the first processing parameter and the second processing parameter.

15. A method according to claim 12, wherein the image data is input by an image reader having a CCD.

16. A method according to claim 12, wherein processing step further comprises the step of performing density correction of the input image data.

17. A method according to claim 12, wherein processing step further comprises the step of performing color correction of the input image data.

18. A method according to claim 12, wherein said processing step further comprises the step of converting spatial frequency characteristics of the input image data.

19. A method according to claim 12, wherein the second mode is a generation copy mode.

20. A method according to claim 12, wherein the first mode is a normal copy mode.

21. An image processing apparatus comprising:
a) input means for inputting image data;
b) processing means for processing the image data input by said input means;
c) output means for forming an image in accordance with the image data processed by said processing means; and
d) setting means for setting a first mode for setting a first process parameter suitable for a first condition which satisfies $D_1 < D_2$ and a second mode for setting a second process parameter suitable for a second condition which satisfies $D_1 \simeq D_2$, where $D_1$ is a maximum recording density which said output means is able to form and $D_2$ is a maximum original density corresponding to a maximum value of the processed image data.

22. An apparatus according to claim 21, wherein said input means comprises an image reader constituted by a CCD sensor.

23. An apparatus according to claim 21, wherein said processing means performs density correction of the input image data.

24. An apparatus according to claim 21, wherein said processing means performs color correction of the input image data.

25. An apparatus according to claim 21, wherein said processing means performs conversion of spatial frequency characteristics of the input image data.

26. An apparatus according to claim 21, wherein said output means includes a plurality of ports for ejecting ink, and heat energy generating means, formed in correpsondance with said plurality of ports, for causing a state change by ink heating, ejecting the ink from each of said plurality of ports on the basis of the state change, and forming at least one flying liquid droplet.

27. An apparatus according to claim 21, wherein said output means includes means for forming a latent image on a photosensitive body and developing the latent image by using a recording agent.

28. An apparatus according to claim 21, wherein the second mode is a generation copy mode.

29. An apparatus according to claim 21, wherein the first mode is a normal copy mode.

30. An apparatus according to claim 21, wherein $D_1$ is not more than 1.8.

31. An image processing apparatus comprising:
a) input means for inputting image data representing an original image;
b) processing means for processing the image data input by said input means;
c) output means for forming a reproduction image in accordance with the image data processed by said processing means; and
d) memory means for storing at least a first parameter for optimizing a resolution to obtain first output image data from first input image data and a second parameter which is different from the first parameter for optimizing a resolution to obtain second output image data from the first output image data as second input image data.

32. An apparatus according to claim 31, wherein said input means comprises an image reader having a CCD sensor.

33. An apparatus according to claim 31, wherein said processing means performs density correction of the input image data.

34. An apparatus according to claim 31, wherein said processing means performs color correction of the input image data.

35. An apparatus according to claim 31, wherein said processing means performs conversion of spatial frequency characteristics of the input image data.

36. An apparatus according to claim 31, wherein said output means includes a plurality of ports for ejecting ink, and heat energy generating means, formed in correpsondance with said plurality of ports, for causing a state change by ink heating, ejecting the ink from each of said plurality of ports on the basis of the state change, and forming at least one flying liquid droplet.

37. An apparatus according to claim 31, wherein said output means includes means for forming a latent image on a photosensitive body and developing the latent image by using a recording agent.

38. An apparatus according to claim 31, wherein the second mode is a generation copy mode.

39. An apparatus according to claim 31, wherein the first mode is a normal copy mode.

40. An image processing apparatus comprising:
a) input means for inputting image data;
b) processing means for processing the image data input by said input means;
c) output means for outputting the image data processed by said processing means; and
d) memory means for storing a parameter for minimizing a color difference between first input image data and first output image data when the first output image data is to be obtained from the first input image data and a parameter for minimizing a color difference between second input image data and second output image data when the second output image data is to be obtained from the first output image data as the second input image data.

41. An apparatus according to claim 40, wherein said input means comprises an image reader having a CCD sensor.

42. An apparatus according to claim 40, wherein said processing means performs density correction of the input image data.

43. An apparatus according to claim 40, wherein said processing means performs color correction of the input image data.

44. An apparatus according to claim 40, wherein said processing means performs conversion of spatial frequency characteristics of the input image data.

45. An apparatus according to claim 40, wherein said output means includes a plurality of ports for ejecting ink, and heat energy generating means, formed in correspondence with said plurality of ports, for causing a state change by ink heating, ejecting the ink from each of said plurality of ports on the basis of the state change, and forming at least one flying liquid droplet.

46. An apparatus according to claim 40, wherein said output means includes means for forming a latent image on a photosensitive body and developing the latent image by using a recording agent.

47. An apparatus according to claim 40, wherein the first mode is a generation copy mode.

48. An apparatus according to claim 40, wherein the second mote is a normal copy mode.

49. An apparatus according to claim 40, wherein the parameters are calculated by a method of least squares.

* * * * *

UNITED STATES PATENT AND TRADEMARK OFFICE
CERTIFICATE OF CORRECTION

PATENT NO. : 5,371,609
DATED : December 6, 1994
INVENTOR(S) : AKIO SUZUKI, ET AL.

It is certified that error appears in the above-identified patent and that said Letters Patent is hereby corrected as shown below:

COLUMN 5

Line 17, "$\Delta E^2_{abk}$." should read --$\Delta E^{*2}_{abk}$--;

Line 57, "multi generation" should read --multi-generation--; and

Line 63, "originals multi-generation" should read --originals when multi-generation--.

COLUMN 6

Line 16, "resolution multi-generation" should read --resolution when multi-generation--.

COLUMN 10

Line 12, "$\frac{1}{9} \{f(i - 1, j - 1)$" should read --$\frac{1}{9} \cdot \{f(i - 1, j - 1)$--

COLUMN 11

Line 1, "ejection: should read --port or--.

UNITED STATES PATENT AND TRADEMARK OFFICE
CERTIFICATE OF CORRECTION

PATENT NO. : 5,371,609

DATED : December 6, 1994

INVENTOR(S) : AKIO SUZUKI, ET AL.

Page 2 of 4

It is certified that error appears in the above-identified patent and that said Letters Patent is hereby corrected as shown below:

COLUMN 14

Line 38, "$E^2_{abk}$." should read --$E^{*2}_{abk}$--; and

Line 62, "
$$\Delta E_{Y-X} = \sum_{k=1}^{n} E^2_{abk} \cdot$$
" should read

--"
$$\Delta E_{Yl-X} = \Delta \sum_{k=1}^{n} E^{*2}_{abk}$$
--.

COLUMN 15

Line 14, "RAN" should read --RAM--; and

Line 47, "multi generation" should read --multi-generation--.

COLUMN 10

Line 20, "{X $K_6 \cdot f(i - 1, j - 1)$" should read
-- $K_6 \cdot f(i - 1, j - 1)$--;

COLUMN 16

Line 45, "$\Delta E^2_{abk}$." should read --$\Delta E^{*2}_{abk}$--; and

Line 49, "$(b^*_{Yl} - B^*_{Xl})^2$ should read --$(b^*_{Yl} - b^*_{Xl})^2$-- .

UNITED STATES PATENT AND TRADEMARK OFFICE
CERTIFICATE OF CORRECTION

PATENT NO. : 5,371,609
DATED : December 6, 1994
INVENTOR(S) : AKIO SUZUKI, ET AL.

It is certified that error appears in the above-identified patent and that said Letters Patent is hereby corrected as shown below:

COLUMN 17

Line 24, "$\Delta E^2_{abk*}$" should read --$\Delta E^{*2}_{abk}$--; and

Line 27, $(b*_{ZI} - B*_{ZI})^2$ should read --$(b*_{ZI} - b*_{XI})^2$--.

COLUMN 18

Line 16, "mode" should read --mode,--;

Line 44, "repsondance" should read --respondence--; and

Line 57, "section" should read --selection--.

COLUMN 19

Line 7, "first data," should read --first image data,--;

Line 25, "pro-" should read --said pro- --;

Line 28, "pro-" should read --said pro- --; and

Line 56, "constituted by" should read --having--.

COLUMN 20

Line 46, "repsondance" should read --respondence--.

UNITED STATES PATENT AND TRADEMARK OFFICE
CERTIFICATE OF CORRECTION

PATENT NO. : 5,371,609

DATED : December 6, 1994

INVENTOR(S) : AKIO SUZUKI, ET AL.

Page 4 of 4

It is certified that error appears in the above-identified patent and that said Letters Patent is hereby corrected as shown below:

COLUMN 22

Line 15, "mote" should read --mode--.

Signed and Sealed this

Second Day of May, 1995

Attest:

BRUCE LEHMAN

Attesting Officer

Commissioner of Patents and Trademarks